United States Patent [19]
Chiu

[11] Patent Number: 5,971,536
[45] Date of Patent: Oct. 26, 1999

[54] EYEGLASS FRAME HAVING APPARATUS FOR REMOVABLY SECURING LENSES THERETO

[76] Inventor: Hsiu-Wen Chiu, Floor 5th, 16-1 Alley 82, Lane 14, Chung-Shiang N. Road, Section 7, Taipei, Taiwan

[21] Appl. No.: 09/167,654

[22] Filed: Oct. 5, 1998

[30] Foreign Application Priority Data

Mar. 16, 1998 [TW] Taiwan ................................. 87203829

[51] Int. Cl.[6] ........................................................ G02C 1/08
[52] U.S. Cl. ................................ 351/41; 351/90; 351/94; 351/108
[58] Field of Search .................................. 351/47, 57, 41, 351/83–86, 90–96, 103–109, 124, 126, 133–135

[56] References Cited

U.S. PATENT DOCUMENTS 5,602,603  2/1997  Bondet ...................................... 351/41

*Primary Examiner*—Huy Mai
*Attorney, Agent, or Firm*—Henricks, Slavin & Holmes LLP

[57] ABSTRACT

An eyeglass frame that allows the lenses to be changed including a front and temples, the front including two rims, a nose engagement seat between the rims, two side retaining seats disposed at both sides of the front respectively, and a slide block for coupling to the nose engagement seat. The nose engagement seat has an outwardly projecting block on its outer surface. The slide block is formed with a grove shaped to match the projecting block such that it may slid over the projecting block to be coupled thereto and cover parts of the rims. The side retain seats are formed with curved grooves for the lenses. The projecting block of the nose engagement seat and the groove of the slide block are interchangeable. Besides, the nose engagement seat may be replaced by a securing seat having retaining grooves at both lateral sides thereof, and two side slide blocks are provided near both ends of the front respectively.

12 Claims, 5 Drawing Sheets

EYEGLASS FRAME HAVING APPARATUS FOR REMOVABLY SECURING LENSES THERETO

BACKGROUND OF THE INVENTION

1. Field of the Invention

The invention relates generally to an eyeglass frame that allows the lenses to be changed and more particularly to an eyeglass frame that allows the wearer to change lenses without use of special apparatus or the help of opticians.

2. Description of the Prior Art

Conventional eyeglasses generally fall into two main types: optical glasses and sunglasses. In optical glasses, the lenses are fixedly mounted in the rims. Likewise, lenses of sunglasses are fixedly mounted, and sunglasses are not suitable for wearing indoors as they block the light. In mounting lenses on a thermoplastic frame, the frame is heated in a heating apparatus so that the rims expand to allow insertion of the lenses. Such cannot be done by the wearer bare-handedly. Fixing lenses in metal frames also requires tools to tighten the tiny screws.

FIG. 1 shows a conventional eyeglass frame that basically comprises a from 1 and temples 3 connected to either end of the front 1. The front 1 is heated in a heating apparatus so that its rims 2 expand to allow mounting of two lenses 4 therein respectively. When the rims 2 are cool and contact, the lenses 4 will be secured therein. In a metallic frame, the front 1 is formed to consist of an upper portion and a lower portion. Lenses 4 are placed inside the rims 2 and the upper and lower portions are joined by tiny screws. Neither of the above methods of mounting the lenses 4 can be done by the wearer without any tools. Thermoplastic frames may easily deform in shape so that the lenses may drop out. For metallic frames, the tiny screws may crack and cannot be removed from the screw holes so that the lenses cannot be firmly secured or the frame cannot be used again.

A user may need to change glasses anytime and he/she has to prepare several pairs of eyeglasses with lenses of different shades or for different purposes, which is very inconvenient.

SUMMARY OF THE INVENTION

The present invention is related to an eyeglass frame that allows the wearer to change lenses without use of special apparatus or the help of opticians.

The primary object of the present invention is to provide an eyeglass frame that allows the user to change the lenses easily without using any tool or requiring the help of an optician.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
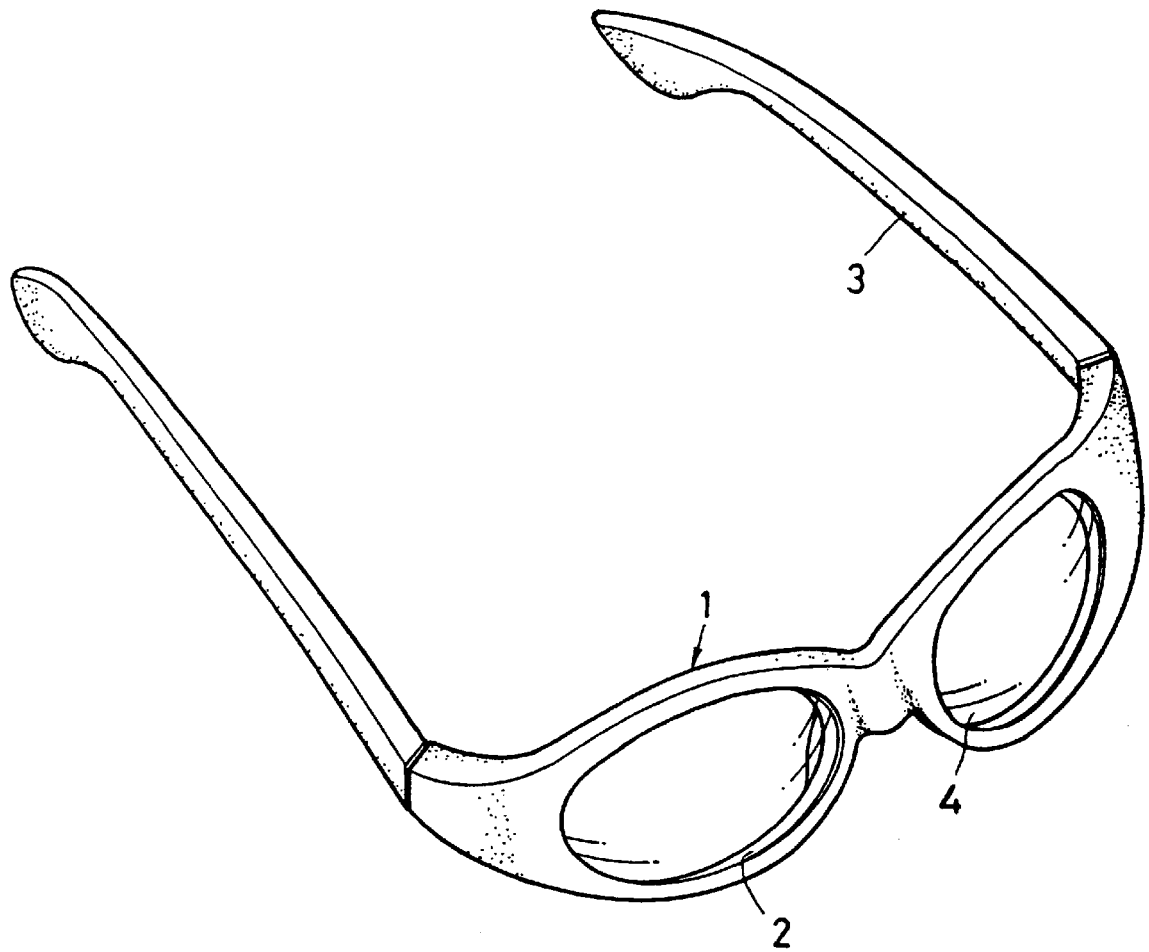
FIG. 1 is a perspective view of the prior art.
Figure 2:
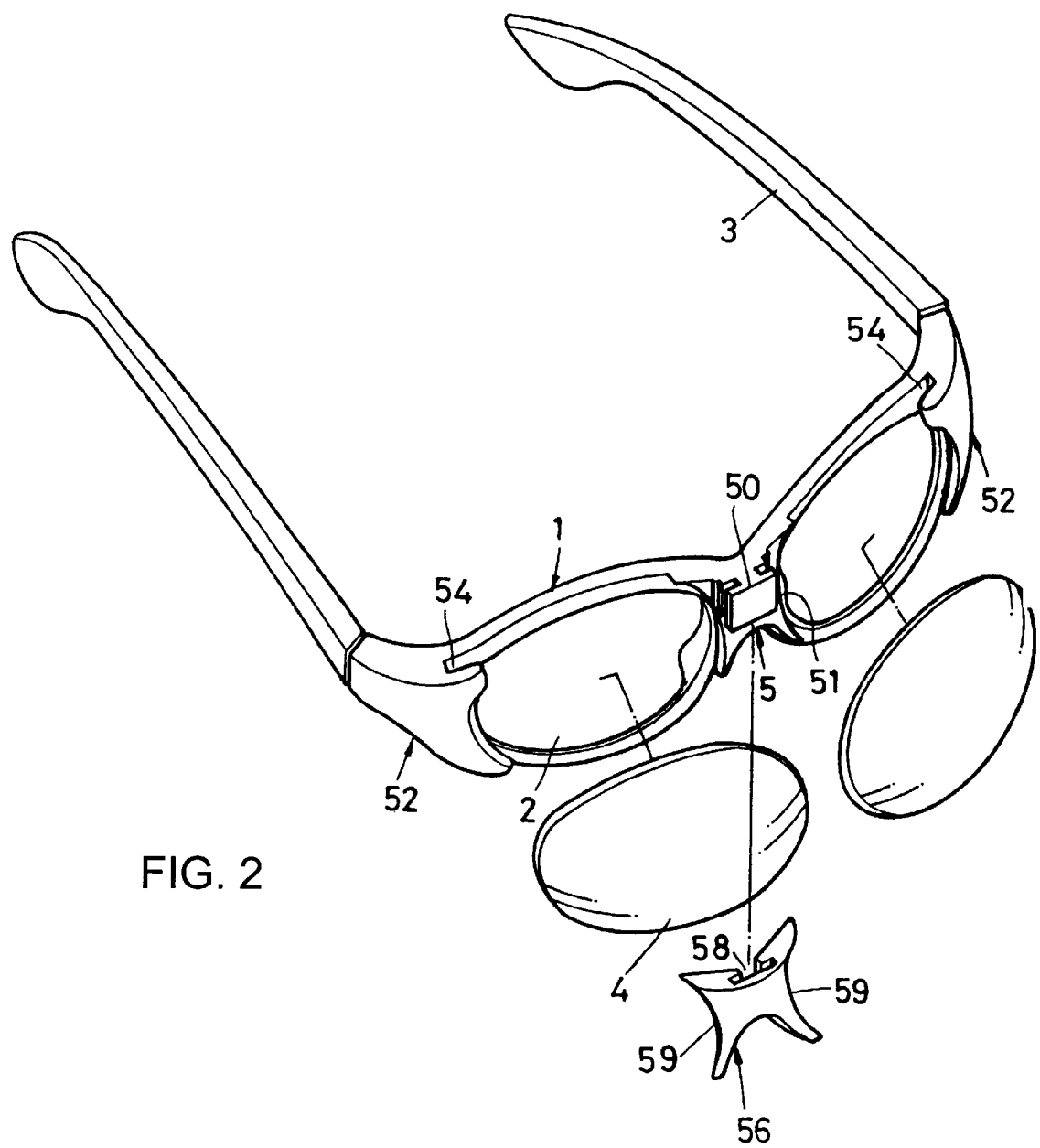
FIG. 2 is a perspective exploded view of the present invention.
Figure 3:
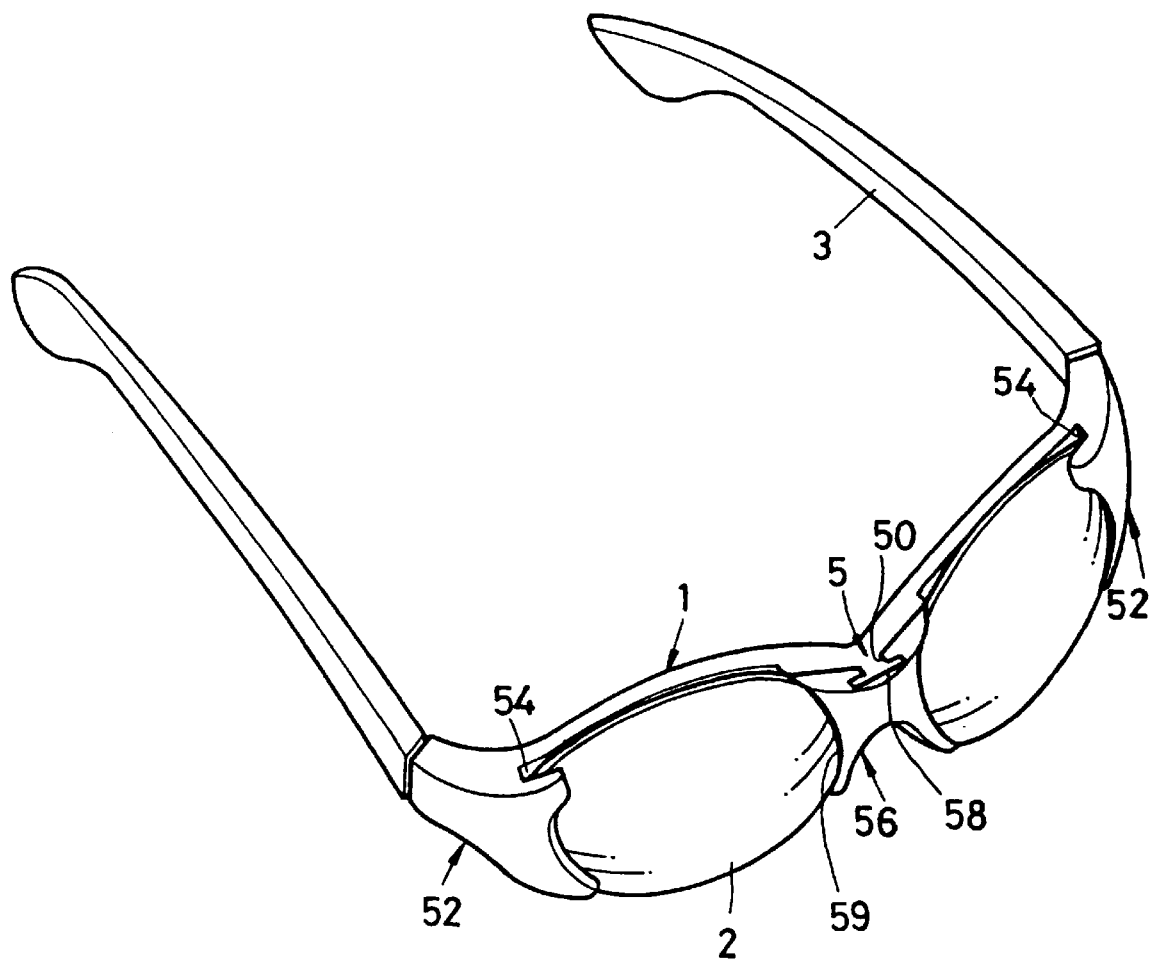
FIG. 3 shows a preferred embodiment of the present invention.

Reference is made to FIG. 2, which shows the eyeglass frame of the present invention that allows insertable change of lenses. In one preferred embodiment, the present invention comprises a front 1 including a nose engagement seat 5 at a middle portion thereof, and a slide block 56 working in cooperation with the engage seat 5. The engagement seat 5 includes an outwardly projecting block 50 on its outer surface. The slide block 56 is formed with a middle groove 58 shaped to match the projecting block 56 such that the groove 58 may be slid over the projecting block 50 from above or below and become coupled thereto. Both ends of the form 1 are provided with side retaining seats 52 respectively. Each side retaining seat 52 shields a part of its corresponding rim 2 and forms a curved groove 54 with the corresponding rim 2. In practice, two interchangeable lenses 4 are firstly placed closed against the outer sides of the rims 2 and slid along the curved grooves 54 of the side retaining seats 52 to be positioned in the corresponding rims 2 of the front 1. The slide block 56 is then slide over the projecting block 50 from above or below such that it covers up a part of the respective lenses 4. Since the front 1 and the lenses 4 are curved, the lenses 4 may be easily secured in position, and the wearer may easily replace the lenses anytime without using any tools (see FIG. 3).

Figure 4:
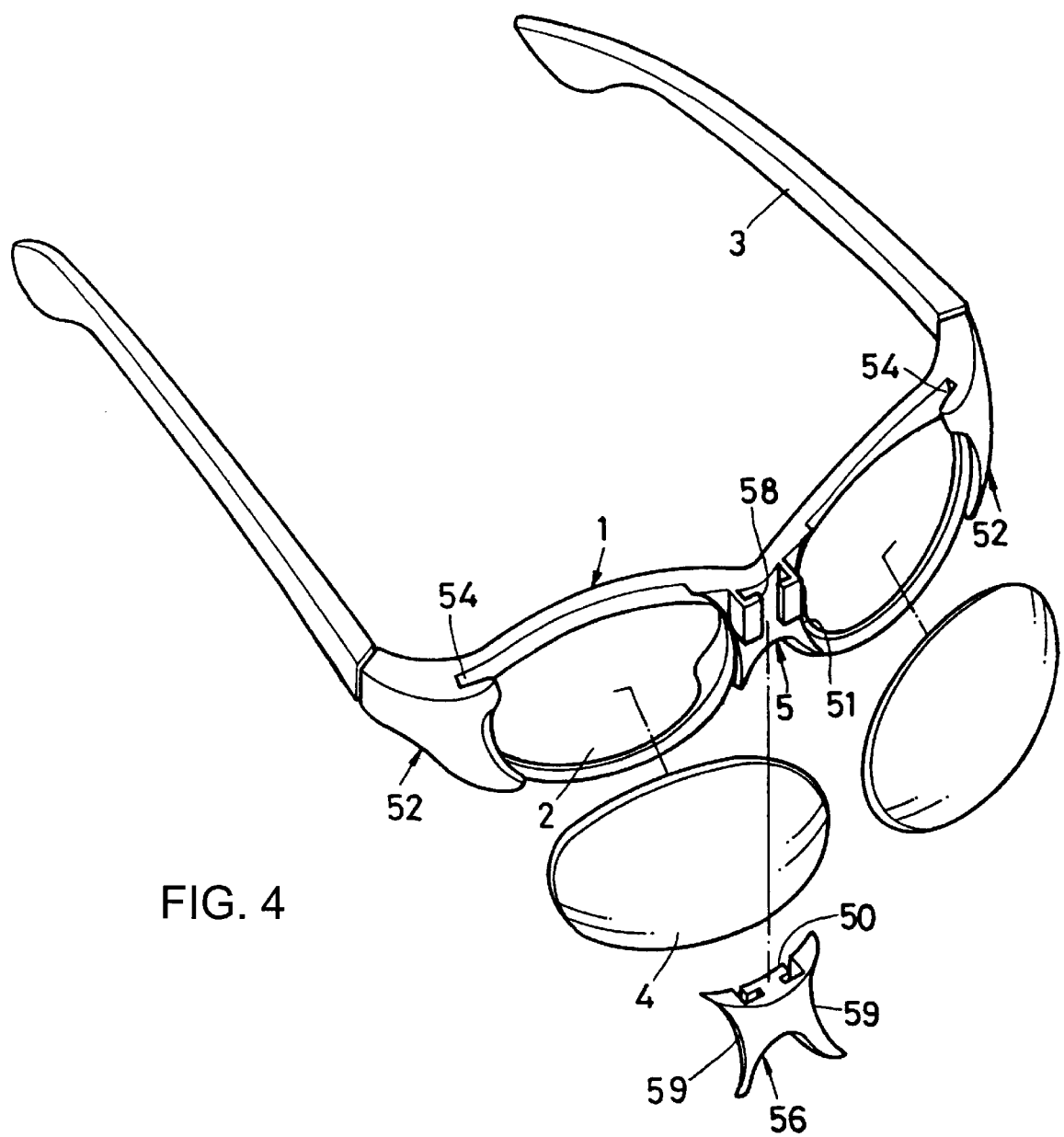
FIG. 4 is an exploded view of another preferred embodiment of the present invention.

As mentioned above, the slide block 56 is coupled to the front 1 by means of the groove 58 engaging the projecting block 50 of the nose engagement seat 5. It should be understood that the projecting block 50 and the groove 58 are interchangeable, that is, the nose engagement seat 5 may be provided with a groove 58 while the slide block 56 is provided with a projecting block 56 shaped to match the groove, as shown in FIG. 4.

In order that the slide block 56 coupled to the nose engagement seat 5 will not block the vision of the wearer, those portions of the nose engagement seat 5 or the slide block 56 near the rims 2 are formed with inwardly curved rims 51 or bent edges 59 respectively.

Figure 5:
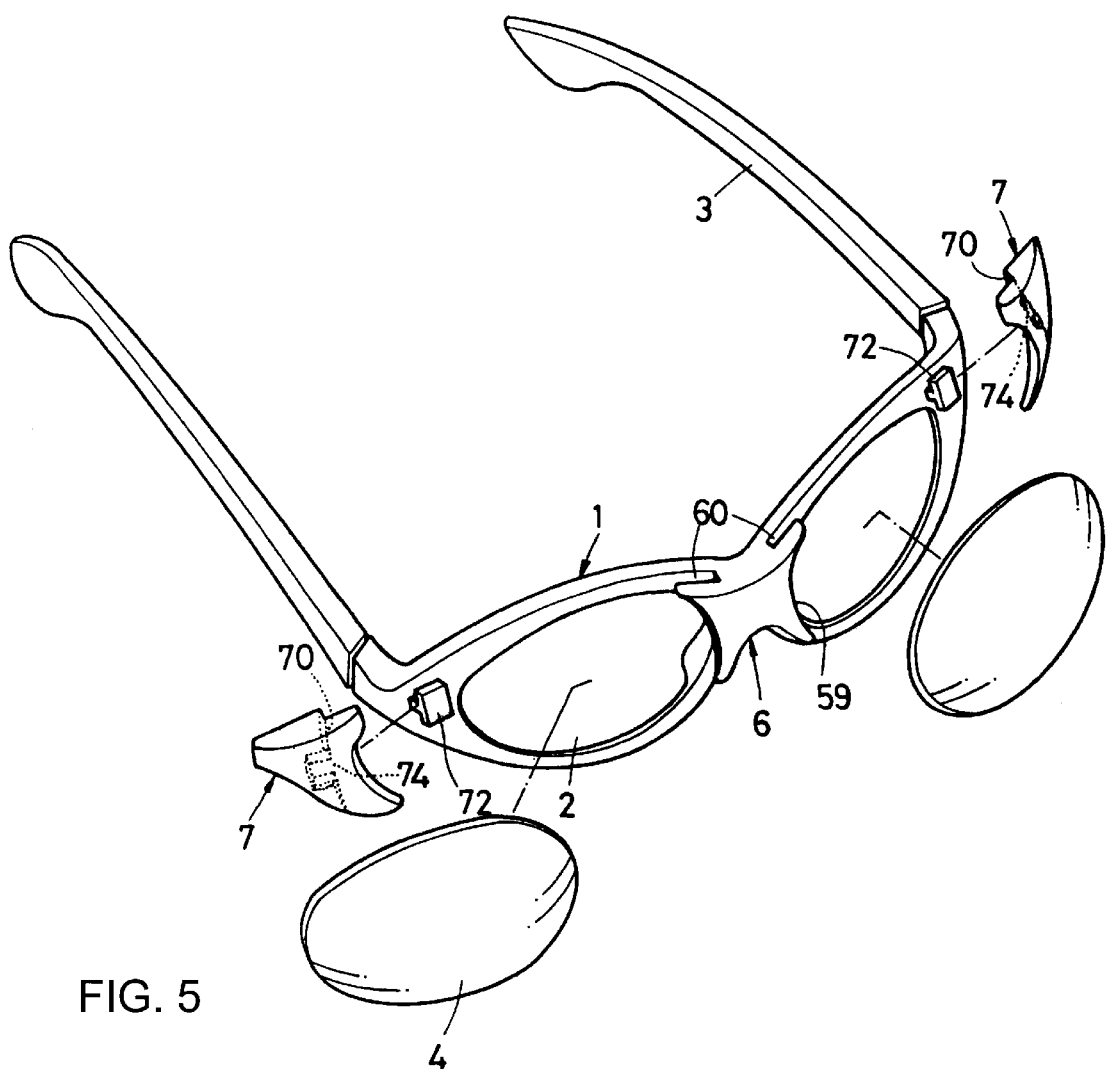
FIG. 5 is a perspective view of yet another preferred embodiment of the present invention.

In addition to the above-described preferred embodiment in which the nose engagement seat 5 coupled with the slide block 56 and the side retaining seats 52 allow the lenses 4 to be slidably fitted in the rims 2 of the front 1 to allow replacement of lenses 4, the slide block 56, as shown in FIG. 5, may be fixedly formed on the nose engagement seat 5 of the at 1 as a securing seat 6. The securing seat 6 is shown to cover a portion of the rims 2 and forms a retaining groove 60 with each rim 2 for retaining the lenses 4. An inverted T-shaped piece 72 is provided near either end of the front 1. The side retaining seats 52 in the embodiment previously described are replaced by independent side slide blocks 7 each having a curved groove 70 near the corresponding rim 2. One side of the curved groove 70 forms a recessed groove 74 shaped to match the inverted T-shaped piece 72. In actual practice, two lenses 4 arm placed against the outer sides of the rims 2 and slid along the retaining grooves 60 of the securing seat 6 into position. The two side slide blocks 7 are then fitted to the inverted T-shaped piece 72 respectively such that they cover parts of the lenses 4. The lenses 4 are thus firmly secured in the rims 2. Likewise, the inverted T-shaped pieces 72 and the recessed grooves 74 are interchangeable, i.e., the curved groove 70 of each side slide block 7 is formed with an inverted T-shaped piece 72 while the ends of the front 1 are provided with recesses grooves 74 shaped to match the inverted T-shaped pieces 72. In summary, the present invention provides an improvement over conventional eyeglass frames whether in terms of structural characteristics or manners of use.

The invention is naturally not limited in any sense to the particular features specified in the foregoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An eyeglass frame for use with a pair of lenses, the eyeglass frame comprising:

a frame member having a pair of side retaining seats each defining a curved retaining seat groove adapted to receive one of the lenses, a nose engagement seat, and a pair of rims respectively extending from the nose engagement seat to one of the side retaining seats; and a removable block member adapted to engage the nose engagement seat and cover a portion of the lenses such that the removable block member and the retaining seat grooves will together secure the pair of lenses to the frame member and further adapted to be disengaged from the nose engagement seat such that the lenses can be removed from the frame member.

2. An eyeglass frame as claimed in claim 1, further comprising:

a pair of temples respectively associated with the side retaining seats.

3. An eyeglass frame as claimed in claim 1, wherein the nose engagement seat includes an outwardly projecting member defining a shape and the removable block member defines a groove corresponding to the shape of the outwardly projecting member.

4. An eyeglass frame as claimed in claim 3, the shape is a T-shape.

5. An eyeglass frame as claimed in claim 1, wherein the removable block member includes an outwardly projecting member defining a shape and the nose engagement seat defines a groove corresponding to the shape of the outwardly projecting member.

6. An eyeglass frame as claimed in claim 5, the shape is a T-shape.

7. An eyeglass frame for use with a pair of lenses, the eyeglass frame comprising:

a frame member having a pair of retaining seats each defining a curved retaining seat groove adapted to receive one of the lenses, at least one engagement seat, and a pair of rims; and at least one removable block member adapted to engage the at least one engagement seat and cover a portion of at least one of the lenses such that the removable block member and one of the retaining seat grooves will together secure the at least one lens to the frame member and further adapted to be disengaged from the at least one engagement seat such that the at least one lens can be removed from the frame member.

8. An eyeglass frame as claimed in claim 7, wherein the frame member includes a nose portion and the retaining seats comprises a portion of the nose portion.

9. An eyeglass frame as claimed in claim 8, wherein the at least one engagement seat comprises a pair of engagement seats and the at least one removable block member comprises a pair of removable block members.

10. An eyeglass frame as claimed in claim 9, wherein the engagement seats include an outwardly projecting member defining a shape and the removable block members define grooves corresponding to the shape of the outwardly projecting members.

11. An eyeglass frame as claimed in claim 10, wherein shape is a T-shape.

12. An eyeglass frame as claimed in claim 7, wherein the at least one engagement seat comprises a nose engagement seat and the retaining seats comprise side retaining seats.

* * * * *